(12) United States Patent
Das

(10) Patent No.: US 7,152,023 B2
(45) Date of Patent: Dec. 19, 2006

(54) SYSTEM AND METHOD OF ACCELERATED ACTIVE SET SEARCH FOR QUADRATIC PROGRAMMING IN REAL-TIME MODEL PREDICTIVE CONTROL

(75) Inventor: Indraneel Das, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 713 days.

(21) Appl. No.: 10/367,458

(22) Filed: Feb. 14, 2003

(65) Prior Publication Data

US 2004/0162709 A1 Aug. 19, 2004

(51) Int. Cl.
*G06F 17/10* (2006.01)

(52) U.S. Cl. .............................. 703/2; 700/30; 700/31; 700/33; 706/21; 708/446

(58) Field of Classification Search .................... 703/2, 703/22; 706/21; 700/28, 29, 30, 31, 32, 700/33, 37, 44; 237/8 R; 708/446; 1/56
See application file for complete search history.

(56) References Cited

U.S. PATENT DOCUMENTS

| | | | | |
|---|---|---|---|---|
| 5,394,322 A | * | 2/1995 | Hansen ......................... | 700/37 |
| 5,682,309 A | * | 10/1997 | Bartusiak et al. .............. | 700/29 |
| 6,064,809 A | * | 5/2000 | Braatz et al. .................. | 703/2 |
| 6,330,483 B1 | * | 12/2001 | Dailey .......................... | 770/28 |
| 6,439,469 B1 | * | 8/2002 | Gruber et al. ............... | 237/8 R |

FOREIGN PATENT DOCUMENTS

WO WO 02/097540 12/2002

OTHER PUBLICATIONS

Kassidas et al., A. Integrating Process and Controller Models for the Design of Self-Optimizing Control, Computers & Chemical Engineering, vol. 24, No. 12, Dec. 2000, pp. 2589-2602.*
Bartlett et al., R.A. Quadratic Programming Algorithms for Large-Scale Model Predictive Control, Journal of Process Control. vol. 12, No. 7, Oct. 2002, pp. 775-795.*
Van Antwerp et al., J.G. Model Predictive Control of Large Scale Processes, Journal of Process Control, vol. 10, No. 1, Feb. 2000, pp. 1-8.*
Stephanopoulos et al., G. Multi-Scale Aspects in Model-Predictive Control, Journal of Process Control, vol. 10, Nos. 1-3, Apr. 2000, pp. 275-282.*
Diehl et al., M. Real-Time Optimization and Nonlinear Model Predictive Control of Processes Governed by Differential-Algebraic Equations, Journal of Process of Process Control, vol. 12, No. 4, Jun. 2002, pp. 577-585.*
Afshari et al., A. A Fuzzy Model-Based Optimal Control Strategy, Proceedings of the 1994 ACM Symposium on Applied Computing, ACM Press, Apr. 1994, pp. 120-125.*

(Continued)

*Primary Examiner*—Russell Frejd
(74) *Attorney, Agent, or Firm*—Carlson, Gaskey & Olds

(57) ABSTRACT

An active set algorithm exploits a 'hot start' for the set of binding constraints at optimality along with efficient linear algebra to make rapid progress towards the solution. The linear algebra is designed to deal with degenerate constraints as the required factorizations are performed and as degeneracy emerges, and not via a mostly unnecessary pre-process step. Combined together, these novel approaches enable solution of the control problem in real-time.

35 Claims, 1 Drawing Sheet

OTHER PUBLICATIONS

Scokaert et al., P.O.M. Constrained Linear Quadratic Regulation, IEEE Transactions on Automatic Control, vol. 43, No. 8, August 1998, pp. 1163-1169.*

Bartlett et al., R.A. Active Set vs. Interior Point Strategies for Model Predictive Control, Proceedings of the 2000 American Control Conference, vol. 6, Jun. 2000, pp. 4229-4233.*

Kouvaritakis et al., C.M. Efficient Active Set Optimization in Triple Mode MPC, IEEE Transactions on Automatic Control, vol. 46, No. 8, Aug. 2001, pp. 1307-1312.*

Search Report EP04250825.

Horowitz B et al., "Quadratic Programming Solver For Large-Scale Structural Optimization Using SQP Algorithm"Selection of contributed papers presented at the International. Conference on computational structures technology and International Conference on engineering computational technology, Sep. 6, 2000, pp. 79-84.

Li W C et al., "A Multistep, Newton-Type Control Strategy For Constrained, Nonlinear Processes", Proceedings of the American control Conference. Pittsburgh, Jun. 21-23, 1989, New York IEE, US, vol. 2 conf. 8, pp. 1526-1527.

Recht P: "Identifying Non-Active Restrictions In Convex Quadratic Programming", Mathematical Methods Of Operations Research, Physica Verlag, Heidelberg, DE, vol. 54, No. 1, 2001, pp. 53-61.

\* cited by examiner

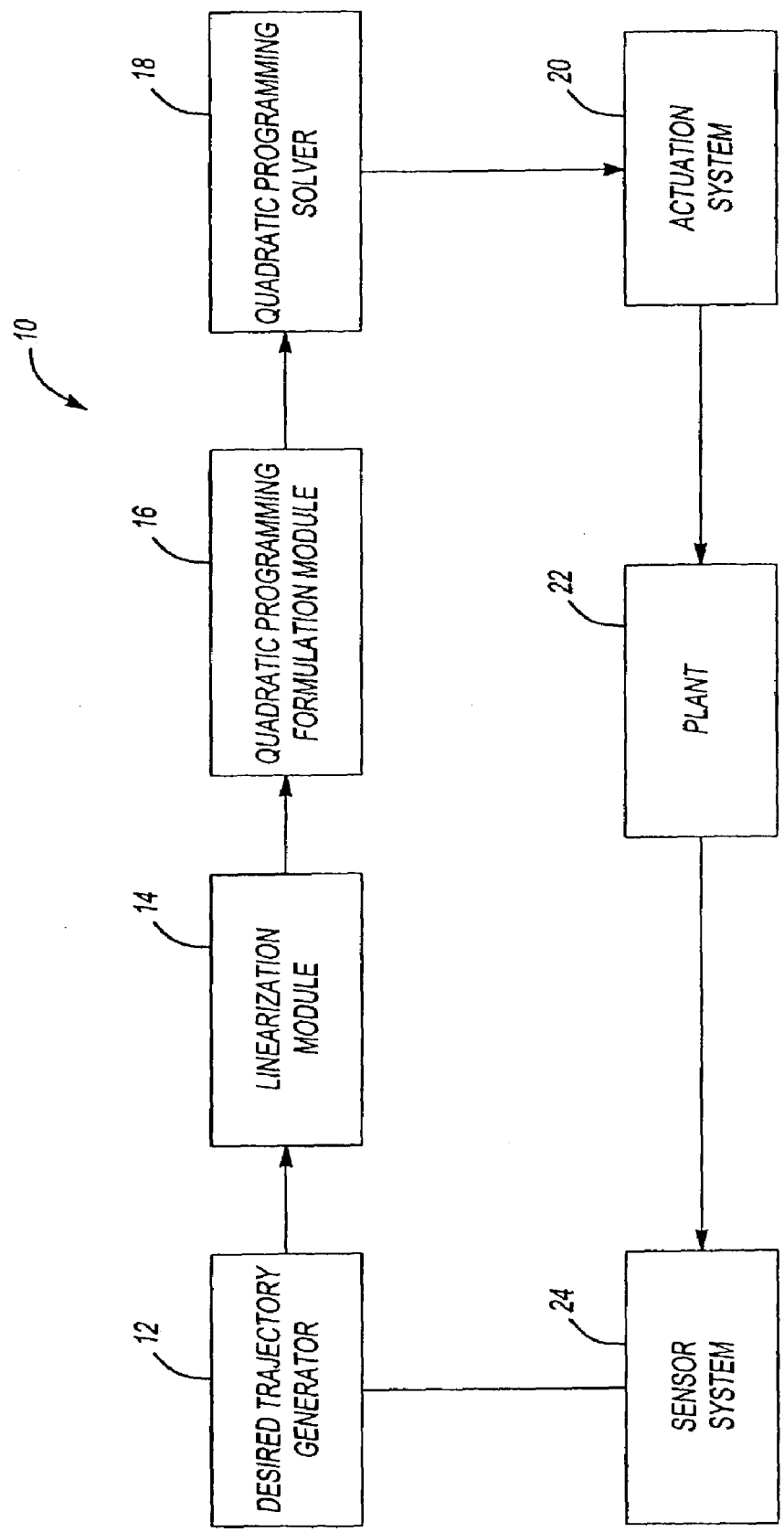

SYSTEM AND METHOD OF ACCELERATED ACTIVE SET SEARCH FOR QUADRATIC PROGRAMMING IN REAL-TIME MODEL PREDICTIVE CONTROL

This invention was conceived in performance of work under U.S. Government Contract N00421-01-2-0131.

BACKGROUND OF THE INVENTION

The present invention relates to on-board optimization techniques for on-board control, and is particularly useful for Model Predictive Control of a dynamical system.

This invention describes a significant enhancement to existing optimization techniques for on-board control. On-board Model Predictive Control of a nonlinear dynamical system often involves linearizing the nonlinear dynamics and posing a Quadratic Program to stay close to a desired profile of outputs. Since on-board control requires computing a reliable solution in a robust manner in real-time, the quadratic programming algorithm needs to use linear algebra optimally.

Model Predictive Control refers to the procedure of determining optimal operating parameters of a dynamic process based on a model of the 'plant,' or the dynamical system. This plant model can be a physics-based model of anything ranging from a gas turbine engine to the acoustics inside a helicopter. It is of interest to engineers to operate such a plant optimally, i.e. meet or exceed certain goals during operation, while honoring physical constraints of the system. To this end, it is common to solve a constrained optimization problem during the operation of the plant, and update the parameters of the optimization problem as the system evolves in time or as the forecast of the future requirements change, and re-solve the problem.

A significant difficulty in this procedure is the need to be able to obtain a reasonable solution for a complex optimization problem in real-time, which is the issue addressed by this invention.

In the past, real-time control has been attempted in chemical engineering applications, particularly in real-time process control. It has also been applied in real-time trajectory planning in aerospace applications. However, the optimization problems arising therein needed to be solved in several minutes, often even hours.

The 'real-time' scale allowed by problems of interest here are on the order of milliseconds. The novel algorithm described herein is capable of addressing this time requirement, without sacrificing the fidelity of the solution, and is thus a significant enhancement to existing methods.

Co-pending application, U.S. Ser. No. 10/308,285, filed Dec. 2, 2002, and entitled Real-Time Quadratic Programming for Control of Dynamical Systems, is commonly assigned and one of the inventors is also the inventor of the present application. The problem that invention mainly addresses is the 'Dynamic Inversion' control problem spanning over only one time step and with a much smaller budget for computation, and hence a different strategy was used in performing the active set hot start. Further, a different procedure was used for dropping constraints during the search for the active set, which consequently required different linear algebra. Though quite different, the method described in this invention can also be an alternate method for solving the quadratic programming algorithm for Dynamic Inversion (though it may not be the better method for Dynamic Inversion).

SUMMARY OF THE INVENTION

The present invention provides an algorithm and apparatus for controlling a dynamical system in real-time. Such dynamical systems include, but are not limited to, gas turbine engines and aircraft flight control systems. The mechanism of searching for the optimal active set or the set of binding constraints described herein can be applied to any convex optimization problem, including convex quadratic programming.

The present invention provides and exploits an 'active set hot start,' i.e. the set of constraints guessed to be binding at optimality. This is different from existing methods which use a starting guess for the solution and not the active set.

The present invention provides a consistent active set method where constraints that are not binding are dropped from the active set, irrespective of the sign of the multiplier. This results in iterates that improve the objective function monotonically.

The present invention also provides an inconsistent active set method where the iterates of the algorithm are not consistent with the active set. This is because most constraints in the initial hot start guess are expected to end up in the optimal active set and hence not dropped, even though inconsistent. While iterates may not improve the objective monotonically, this results in faster convergence and better performance in real-time when the starting guess is even moderately good.

The present invention provides a mechanism for detecting linear dependency in the set of active constraints in an iteration without prior pre-processing using the steps in the current factorization. The present invention also provides a 'big-K' formulation of the Quadratic Program for a values of $M \geq 0$ and $K>0$ to simultaneously attain a feasible and optimal solution in the absence of knowledge of an initial feasible point. Any or all of the above techniques can be applied to a sparse version of the optimization.

BRIEF DESCRIPTION OF THE DRAWINGS

Other advantages of the present invention will be readily appreciated as the same becomes better understood by reference to the following detailed description when considered in connection with the accompanying drawings wherein:

The FIGURE illustrates one type of control system that uses the quadratic programming method of the present invention.

DETAILED DESCRIPTION OF A PREFERRED EMBODIMENT

The Generic Problem

FIG. 1 is a generic model of a control system 10 using Model Predictive Control and of a type that would benefit from the present invention. The control system 10 includes a desired trajectory generator 12 which creates a desired profile of the outputs of the system 10. A linearization module 14 derives a linearized model about the desired trajectory from the desired trajectory generator 12. A quadratic Programming formulation module 16 forms a quadratic program to determine a control profile for best attaining the desired trajectory while respecting any constraints. The Quadratic Programming Solver 18 solves the optimization problem established by the formulation module 16 to generate a profile of the optimal controls. The Quadratic Programming Solver 18 is the focus of this invention. The profile of the optimal controls is sent to an actuation system 20, which acts on the plant 22 of the system 10. The sensor system 24 provides feedback from the plant 22 to the desired trajectory generator 12.

The forthcoming formulation of the optimization problem for the MPC is included here only for the sake of completeness. Consider a nonlinear dynamical system with control variables u, state variables x and responses (or outputs) y, that are related as $$\frac{dx}{dt} = \phi(x, u)$$

$$y = h(x, u)$$

A discrete time version of the above with uniform time intervals can be written as $$x_{t+1} = x_t + \phi(x_t, u_t)\Delta t$$

$$y_t = h(x_t, u_t) \; t=1, 2, \ldots, N.$$

The nonlinear functions $\phi$ and $h$ are commonly linearized about base points which are steady state points, i.e., ones at which $\dot{x}$ vanishes. Given such a steady state base point $x_s, u_s$, i.e., one where $\phi(x_s, u_s) = 0$, the discrete time system can be linearized as $$x_{t+1} = x_t + \phi_x(x_s, u_s)(x_t - x_s)\Delta t + \phi_u(x_s, u_s)(u_t - u_s)\Delta t$$

$$y_t = h(x_s, u_s) + h_x(x_s, u_s)(x_t - x_s)\Delta t + h_u(x_s, u_s)(u_t - u_s)\Delta t$$

$$t = 1, 2, \ldots, N,$$

where $\phi_x$ denotes the Jacobian of $\phi$ with respect to x, and so on.

Control engineers commonly express the above system as $$x_{t+1} = xb_t + A_t x_t + B_t u_t \quad (1)$$

$$y_t = yb_t + C_t x_t + D_t u_t \; t=1, 2, \ldots, N. \quad (2)$$

where $$A_t = I + \phi_x(x_s, u_s)\Delta t$$

$$B_t = \phi_u(x_s, u_s)\Delta t$$

$$C_t = h_x(x_s, u_s)\Delta t$$

$$D_t = h_u(x_s, u_s)\Delta t$$

$$xb_t = -(\phi_x(x_s, u_s)x_s + \phi_u(x_s, u_s)u_s)\Delta t$$

$$yb_t = h(x_s, u_s) - (h_x(x_s, u_s)x_s + h_u(x_s, u_s)u_s)\Delta t.$$

The time dependence of the above parameters that define the linearized discrete time system is tacitly bidden in $(x_s, u_s)$, the point about which the linearization is performed, which is chosen afresh for each time point. Note that in this quasi-Linear parameter (q-LPV) varying model, this point of linearization can be a convex combination of several steady state points. The q-LPV model, while no substitute for a true nonlinear model, is often sufficient for the level of accuracy required in a feedback control framework. If a true nonlinear model were to become available, the techniques described herein are just as applicable to the quadratic programs obtained from a true linearization.

Objective Given the above description of the system, the aim is to optimally control the system over a particular time window. The degree of success in doing so is measured by how closely the variables of the system track certain reference trajectories. If $T_t^y, T_t^x, T_t^u$ represent reference trajectories for $y_t, x_t, u_t$, the desired objective can be expressed as $$\min_{x,y,u} \sum_t (y_t - T_t^y)^T W_y (y_t - T_t^y) +$$

$$\sum_t (x_t - T_t^x)^T W_x (x_t - T_t^x) + \sum_t (u_t - T_t^u)^T W_u (u_t - T_t^u)$$

The diagonals of the weighting matrices represent the relative weights of the various objectives. We usually have only one or two primary objectives, while the rest are secondary. While the weights on the secondary objective are set to a small number, they are always non-zero and sufficiently large so that the Hessian of the problem is not very poorly conditioned. We generally try to keep the condition number below $10^7$ for double precision computation. This is also necessary to ensure that there is a unique solution for the optimal controls even in the absence of constraints. If not, imagine the case where the system could be in steady state, but yet the optimal controls could be jumping around, causing what engineers call 'chattering.' The reason for re-casting the problem formulation is to justify solving a convex quadratic program, and not to cover the formulation under this patent.

Constraints Bound constraints are typically imposed on x,y,u, as well as on their rates of change. In addition, there are other linear inequality constraints involving combinations of these variables. The inequality constraints can thus be expressed as $$A_0 U \leq b_0$$

where $$U = \begin{pmatrix} y_1 \\ u_1 \\ x_2 \\ y_2 \\ u_2 \\ \vdots \\ x_N \\ y_N \\ u_N \end{pmatrix}$$

represents the vector of optimization variables. Note that $x_1$ is not an optimization variable since the initial state and control variables from the prior time determine the states $x_1$ at the first time point.

The Quadratic Program

We can represent the above as a strictly convex Quadratic Program (QP) in the following form $$\min_p \frac{1}{2} p^T Z^T H_0 Z p + (c_0 + H_0 U_f)^T Z p \quad (3)$$

$$s.t. \; A_0 Z p \leq b_0 - A_0 U_f.$$

The above QP with equality and inequality constraints is large and sparse. Experience with active set algorithms for real-time control has shown the advantage of considering a dense formulation with fewer variables. Below we outline a way of deriving the above dense formulation for the original QP.

Let Z be a matrix whose columns form a basis for the null space of $E_0$. Given any particular $U_f$ that satisfies $E_u U_f = r_0$, the family of solutions for the equality constraints can be expressed as $$U = U_f + Zp \qquad (4)$$

where $p \in \Re^m$, and m is the dimension of the null space of $E_0$.

Substituting (4) in the original problem yields the following reduced dense QP in p:

$$\min_p \frac{1}{2} p^T Z^T H_0 Zp + (c_0 + H_0 U_f)^T Zp \qquad (5)$$

$$s.t. \ A_0 Zp \le b_0 - A_0 U_f$$

The next section describes a method for computing the matrix Z by exploiting the state equations (1) and (2) defining the equality constraints in (3), and without performing an actual factorization.

Computing a Basis for the Null Space

The null space of interest comprises all U that satisfy $$E_0 U = 0.$$

Consider splitting the variables U into $U_B$ and $U_{NB}$. Let the columns of $E_0$ corresponding to $U_B$ form the submatrix $E_B$ and those corresponding to $U_{NB}$ form $E_{NB}$. We will assume that the splitting is done in such a manner that $E_B$ is square and non-singular. Then for all U in the null space, $$E_B U_B + E_{NB} U_{NB} = 0$$

i.e. $U_B = -E_B^{-1} E_{NB} U_{NB}$.

Thus all vectors U in the null space of $E_0$ can be written as $$U = \begin{pmatrix} U_B \\ U_{NB} \end{pmatrix} = \begin{pmatrix} -E_B^{-1} E_{NB} U_{NB} \\ U_{NB} \end{pmatrix} = \begin{pmatrix} -E_B^{-1} E_{NB} \\ I \end{pmatrix} U_{NB}.$$

It is not difficult to argue that the matrix $$Z = \begin{pmatrix} -E_B^{-1} E_{NB} \\ I \end{pmatrix}$$

contains columns that form a basis for the null space of interest, and the vector $U_{NB}$ assumes the role of p. In contrast with, say, a null space computed using a QR factorization, part of it is a sparse identity block. Even more importantly, it is never necessary to invert the matrix $E_B$ in order to compute the rest of Z if we choose our variable splitting wisely, as shown next.

Let us choose $U_{NB}$ as the vector of control variables stacked in time, i.e., $$U_{NB} = u = \begin{pmatrix} u_1 \\ u_2 \\ \vdots \\ u_N \end{pmatrix}.$$

$U_B$ then becomes the corresponding vector of outputs and state variables, stacked in time. By examining $U_B = -E_B^{-1} E_{NB} U_{NB}$, it is evident that the $i^{th}$ column of $-E_B^{-1} E_{NB}$ is given by the value of $U_B$ when $U_{NB} = e_i$, the vector with a 1 in its $i^{th}$ position, and zeros elsewhere. This reduces to computing the values of the states and outputs for every setting $e_i$ of $U_{NB}$, which, amounts to running a simulation through the state equations (1) and (2) by setting a control variable in one particular time point to 1, and the rest to 0. Thus no actual factorization is needed.

This is essentially equivalent to computing what is known in control theory as the standard basis. However, we just derived it from a separate mathematical viewpoint.

The Reduced, Dense Problem

Based on the choice of Z and $p = U_{NB} = u$ in the previous subsection, the QP in (5) assumes the form $$\min_u \frac{1}{2} u^T H u + c^T u \qquad (6)$$

$$s.t. \ Au \le b,$$

where $$H = Z^T H_0 Z, \ c = Z^T (c_0 + H_0 U_f),$$

$$A = A_0 Z, \ b = b_0 - A_0 U_f.$$

It is this reduced dense strictly convex QP with inequality constraints that we will develop algorithms for in the rest of the paper. Note that the iterations and fundamental math in the QP algorithm are equally applicable to sparse problems as well.

Algorithm for Searching for the Optimal Active Set

Active set algorithms search iteratively for the set of binding constraints at optimality, usually referred to as the active set. For model-predictive control problems, the solution to the MPC problem in the current time step provides a guess for the optimal active set in the next time step. This particular guess is used to great advantage to cut down on the number of iterations required for solving the QP to convergence, a feature that is practically indispensable in real-time control. The broad steps of the active set algorithm are sketched below, and the associated linear algebra is elaborated in the following section.

Start off with a guess for an active set. We will denote the set of indices of constraints in the active set by W, and also characterize by E the rows in the constraint matrix A corresponding to the guessed active set. Assume a feasible point $u_f$ is known, i.e., $Au_f \le b$.

In iteration k, given a guess E for the active constraints, solve the Equality-Constrained QP (EQP)

$$\min_u \frac{1}{2} u^T H u + c^T u \qquad (7)$$

$$s.t. \ Eu = r,$$

where r represents the sub-vector of right hand sides for the active constraints. The optimal u*, and Lagrange multipliers λ* are given by $$\begin{bmatrix} H & E^T \\ E & 0 \end{bmatrix} \begin{bmatrix} u^* \\ \lambda^* \end{bmatrix} = \begin{bmatrix} -c \\ r \end{bmatrix} \qquad (8)$$

Ratio Test Determine largest as $\alpha \in [0,1]$ such that $u^{k-1}+\alpha s$ is feasible, where $s=u^*-u^{k-1}$, and $u^{k-1}$ denotes the prior iterate. Note that $u^0=u_f$. In other words, $\alpha$ is picked to be the largest value in $[0,1]$ such that $Au^{k-1}+\alpha As \leq b$. This test need not be performed for constraint indices i that are in the active set, since they have $As=0$ (or $As_i \leq 0$ in iteration 1), and the prior iterate $u^{k-1}$ is feasible. (footnote: It is possible to have degenerate constraints not in the active set that have $As_i=0$, and the ratio test over such constraints would also be skipped.) Thus $\alpha$ is given by $$\alpha = \min_{i \notin W} \frac{b_i - (Au^{k-1})i}{As_i}.$$

Update the guess for the active set in the next iterate.

Add to W the first index $i_B$ corresponding to which $\alpha$ achieves its minimum value in the ratio test, the guess for the active indices in the next iterate. The corresponding constraint is loosely referred to as the 'tightest constraint'.

If there exist constraints for which the Lagrange multiplier $\lambda^*$ in the EQP (7) is negative, drop the constraint with the most negative multiplier from the active set. This is the so-called steepest edge rule. Bland's Rule is deployed whenever degeneracy is detected in the active set, and in these instances, the first constraint with a negative multiplier is dropped. Details on treatment and detection of degeneracy appear later in this disclosure.

Special case for first iteration Define a constraint in the initial active set to be consistent if the constraint is binding at $u_f$. If in the first iteration $\alpha<1$, then all constraints that are not consistent are dropped, irrespective of the sign of their multiplier. This is because if $Eu_f \leq r$ with strict inequality for some components, the updated iterate $u^1=u_f+\alpha(u^*-u_f)$ does not satisfy $Eu^1=r$ for all constraints in the active set for the next iteration, leading to a discrepancy. This is the consistent active set method. For example, if $u_f$ is in the strict interior of the feasible set, this could lead to dropping all the constraints and re-starting with an empty active set, thereby allowing little exploitation of 'hot start'. However, if $u_f$ is the set of optimal controls obtained by solving the MPC problem at the prior time step, it is usually consistent with the initial guess for the active set.

The Inconsistent active set method In some cases, the known feasible point is largely inconsistent with the starting guess for the active set. This leads to many inconsistent constraints being dropped from the active set at the end of the first iteration. If the initial hot start guess is a good one, many iterations are wasted in picking these constraints back up. Thus another approach is to retain the inconsistent constraints in the active set and continue the search for the optimum even though the iterate and the active set disagree. This inconsistency disappears if in any iteration $\alpha=1$. Moreover, the degree of inconsistency reduces at every iteration. The inconsistent method usually allows far more rapid convergence to the optimum than the consistent method.

Update the iterate $$u^k = u^{k-1} + \alpha s.$$

Convergence to the global optimum is achieved when $\alpha=1$ and $\lambda^* \geq 0$, i.e., when the active set does not change.

If the allowed time within the real-time interval is exhausted before convergence is reached, the last updated iterate is returned as the solution.

Monotonically improving iterates It can be proved by using convexity that the iterates in the consistent active set algorithm improve the quadratic objective monotonically (with strict improvement for non-zero $\alpha$).

Details of Linear Algebra

In this section, we are going to describe linear algebra computations necessary to protect us in the event of degeneracy and to obtain an exact solution to the EQP with as little computation as possible.

Since in our problem H is strictly positive definite, u can be eliminated in (8) and the solution EQP (7) can be written in closed form as $$\lambda^* = -(EH^{-1}E^T)^{-1}(r+EH^{-1}c) \qquad (9)$$

$$u^* = -H^{-1}c - (EH^{-1})^T \lambda^* \qquad (10)$$

Since we can perform a Cholesky factorization of H ($H=LL^T$, L is lower triangular) at the onset and re-use it at every iteration, this is cheaper than solving the larger system (8) at every iteration. Moreover, it should be noted that the unconstrained solution to the quadratic objective, $$u_{unc} = -H^{-1}c$$

can also be computed at the onset using the Cholesky factorization and re-used at every iteration in the computations in (9) and (10).

Degeneracy

Degeneracy is caused by introducing redundant constraints whose physical equivalents are already represented by other constraints, and which could alternately have been expressed as linear combinations of other constraints. Often, such dependent constraints could become active at the same time, and end up in the working set. This results in the loss of row rank in E, the matrix of active constraints, leading to a zero or near-zero condition number reciprocal for $EH^{-1}E^T$, the coefficient matrix in computing $\lambda^*$ as per (9).

The suggested approach in standard practice/literature is to make sure that redundant constraints do not appear in the problem formulation. This may not be possible because we have to allow for the possibility that constraints may become degenerate 'on the fly.' This is more so, given that often near-redundant constraints based on multiple sensor readings are imposed to ensure robustness with respect to not violating the constraint.

The second safeguard adopted in most commercial codes is that of pre-processing, or eliminating redundant constraints by a prior examination of the constraint matrix. This involves steps similar to Gaussian Elimination, and is extra computation wasted in the dominant majority of cases where degeneracy is not an issue.

In contrast, we aim to detect and deal with degeneracy in the active set as it shows up, and without doing any extra linear algebra than what we would need to solve the EQP anyway. In the invention Accelerated Quadratic Programming for On-board Real-Time Control, this was achieved by performing a QR factorization of $EH^{-1}E^T$ in determining (9), and setting the components of $\lambda^*$ corresponding to near-zero pivots in R to zero. This is consistent with the fact that the redundant constraints do not play a role in the optimization.

Here we take advantage of the fact that the active set changes more traditionally, i.e. we pick up one binding constraint, and drop no more than one constraint, as opposed to drop all constraints with negative multipliers. The computations sketched out below allow us to efficiently update the product $EH^{-1}E^T$ as well as the associated factorization, while detecting degeneracy in course of the factorization.

Given L, the Cholesky factor of H, $$EH^{-1}E^T = M^T M, \text{ where } M = L^{-1}E^T.$$

Instead of performing a QR factorization of $M^T M$, we perform a QR factorization of M itself. The advantage is that this, much like the other alternative of QR on $M^T M$, reveals any rank loss in E due to degeneracy, while performing the factorization on M which has a condition number that is only the square root of the condition number of $M^T M$. Consider computing a sequence of Householder transformations $Q_i$ needed for the QR decomposition of M:

$$Q^{(m-1)} \ldots Q^{(2)} Q^{(1)} M = R.$$

Let na be the number of active constraints, i.e., the number of rows in E or M. The $j^{th}$ Householder transformation operating on column j of M zeros out every element in column j, rows j+1 through na. Thus, the upper triangular matrix R is formed. Let v be the column vector such that the first j−1 elements are 0, and on the rest, matches the elements of column j of $Q^{(j-1)} \ldots Q^{(1)} M$ (the intermediate reduced matrix). This Householder transformation can then be expressed as $$Q^{(j)} = I - \frac{2vv^T}{v^T v}.$$

If column j of E represents a degenerate constraint, and can be formed as a linear combination of columns 1 through j−1 of E, the same is true of column j of M. Then the preceding Householder transformations $Q^{(j-1)}$ through $Q^{(1)}$ on M would have already zeroed out elements j through na in column j of the intermediate reduced matrix. Then the vector v for the Householder transformation based on that sub-column would be all zeros, thereby indicating the presence of a linearly dependent constraint. Whenever we detect such degeneracy, we skip the corresponding column of M and set the corresponding $\lambda^*_j$ to 0, effectively dropping the constraint as degenerate. We then find the next column that offers a non-zero v and compute the corresponding Householder transformation. Since the product of the resulting Householder transformations is orthogonal, the resulting R satisfies $$R^T R = \hat{M}^T \hat{M} = \hat{E} H^{-1} \hat{E}^T,$$

Where $\hat{E}$ is the original matrix E of active constraints with the degenerate rows excluded. Thus detection of degeneracy and factorization are achieved simultaneously.

Let $\hat{G} = L^{-T} \hat{M} = H^{-1} \hat{E}^T$. Now $\lambda^*$ can be computed by a forward solve and a back solve, i.e., two $O(n^2)$ operations on the system $$R^T R \lambda^* = -r - \hat{G}^T c. \quad (11)$$

We can compute $u^*$ as $$u^* = u_{unc} - \hat{G}^T c.$$

Updating Matrix Products

The matrices M and $G = L^{-T} M$ that appear in the preceding computations can be updated given the matrices from the prior iteration, rather than computed from scratch, which reduces an expensive matrix product operation to two $O(n^2)$ operations.

Consider the matrix $\tilde{E}$ that has an extra row, a, added to E. Without loss of generality, this can be expressed as $$\tilde{E} = \begin{bmatrix} E \\ a \end{bmatrix}.$$

Then $$\tilde{M} = L^{-1} \tilde{E}^T = [L^{-1} E^T | L^{-1} a^T] = [M | L^{-1} a^T].$$

Given the knowledge of M, all that is required to be computed is $L^{-1} a^T$, which is a forward sole on the system $L\xi = a^T$ costing only $O(n^2)$. Similarly $$\tilde{G} = L^{-T} \tilde{M} = [L^{-T} M | L^{-T} L^{-1} a^T] = [G | L^{-T} \xi],$$

and can thus be updated with a similar $O(n^2)$ operation.

In going from one active set iteration to the next, either a row is dropped from E (update is simply to drop the corresponding column from M and G), or a row is added, or both, and it is clear how the matrix products can be updated in all of these cases. Moreover, in our implementation, we store all the vectors $\xi$ and $L^{-T}\xi$ from prior iterations, so if a constraint that was ever active re-appears in the active set at a later iteration, the corresponding $\xi$ and $L^{-T}\xi$ do not need to be re-computed. This requires extra storage equal to twice the size of A, which is of minimal concern given our reduced dense formulation of the MPC problem and available memory.

Updating the Factorization

It is also possible to update the QR factorization of M at every iteration, which essentially replaces the only remaining $O(n^3)$ operations with cheaper computation.

Consider the sequence of Householder transformations that put M in upper triangular form $$Q^T M = R.$$

Consider first the simple case where only one row a has been added to E (and hence M), and none dropped. Then $$Q^T \tilde{M} = Q^T [M | L^{-1} a_T] = [Q^T M | Q^T L^{-1} a^T] = [R | Q^T \xi]$$

Appending $Q^T \xi$ to R, which has more rows than columns and is upper triangular, results in a structure similar to $$Q^T \tilde{M} = \begin{bmatrix} * & * & * & * & \times \\ 0 & * & * & * & \times \\ 0 & 0 & * & * & \times \\ 0 & 0 & 0 & * & \times \\ 0 & 0 & 0 & 0 & \times \\ 0 & 0 & 0 & 0 & \times \\ \cdot & \cdot & \cdot & \cdot & \cdot \\ 0 & 0 & 0 & 0 & \times \end{bmatrix},$$

where * denotes elements of R and x denotes elements of the vector $Q^T \xi$.

It is easy to see that one Householder transformation, say $\tilde{Q}$, on the last column can put the matrix in upper triangular form, i.e.

$$\tilde{Q}Q^T\tilde{M} = \begin{bmatrix} * & * & * & * & \times \\ 0 & * & * & * & \times \\ 0 & 0 & * & * & \times \\ 0 & 0 & 0 & * & \times \\ 0 & 0 & 0 & 0 & * \\ 0 & 0 & 0 & 0 & 0 \\ \cdot & \cdot & \cdot & \cdot & \cdot \\ 0 & 0 & 0 & 0 & 0 \end{bmatrix},$$

which costs only O(n), involving a simple norm computation of the relevant sub-vector in the last column. This updates the R matrix, and the updated Q can be represented as $\tilde{Q}Q^T$.

The update is slightly more complicated when a row is dropped from E. Equivalency, consider M obtained by dropping an intermediate column, and suppose $Q^T$ represents the sequenced of Householder transformations that put M in triangular form. Then $$Q^T\tilde{M} = \begin{bmatrix} * & * & * & * & \times \\ 0 & * & * & * & \times \\ 0 & 0 & * & * & \times \\ 0 & 0 & \hat{*} & * & \times \\ 0 & 0 & 0 & \hat{*} & \times \\ 0 & 0 & 0 & 0 & \hat{*} \\ \cdot & \cdot & \cdot & \cdot & \cdot \\ 0 & 0 & 0 & 0 & \times \end{bmatrix},$$

where $\hat{*}$ represents the elements previously on the diagonal of R that have spilled into the first lower triangular band due to the dropping of the intermediate column. If the $j^{th}$ column was dropped, a sequence of Givens Rotations can be applied to $Q^T\tilde{M}$ to zero out the lower triangular band. This involves at most the cost of two Householder transformations, depending on the location of the dropped column. Let such a sequence of Givens rotation be $Q_1, \ldots, Q_{m_j}$, i.e., $$Q_{m_j}\cdots Q_1 Q^T\tilde{M} = \begin{bmatrix} * & * & * & * & * \\ 0 & * & * & * & * \\ 0 & 0 & * & * & * \\ 0 & 0 & 0 & * & * \\ 0 & 0 & 0 & 0 & * \\ 0 & 0 & 0 & 0 & 0 \\ \cdot & \cdot & \cdot & \cdot & \cdot \\ 0 & 0 & 0 & 0 & 0 \end{bmatrix}.$$

The upper-triangularized matrix above thus provides the updated R, while the updated Q can be expressed as $Q Q_1^T \cdots Q_{m_j}^T$.

Observe that it is never necessary to store any of the Householder or Givens Rotation matrices. One can simply store the vectors v associated with the Householder transformations, and the parameter $\cos\theta$ associated with each Givens transformation in the computation. This is because to perform a multiplication with a column, it is cheaper to multiply by the sequence of orthogonal transformations using the properties of the transformation than it is to form the product of the orthogonal transformations and multiply by the resulting dense matrix.

Restoring Feasibility

Since the problem we are solving has nonlinear dynamics, it is often the case that owing to differences caused by a new linearization, the optimal controls $u_f$ from the previous time period are not feasible in the current time period. Such infeasibility is also incurred by Betts in the course of solving the QPs arising in his SQP approach to the nonlinear MPC, and he suggests solving a 'phase-I' problem to minimize infeasibility, a common approach in problems with linear constraints. However, with this approach, we could use up the allowed computation time and still not have a feasible solution, while having made no progress towards optimality. For these reasons, we choose to solve the so-called 'big-M' problem, which minimizes a weighted sum of the original objective and a measure of infeasibility. Instead of solving the original QP (6), the traditional big-M method introduces an extra variables $\tau$ and proposes to solve $$\min_{u,\tau} \frac{1}{2}u^T Hu + c^T u + M\tau$$

s.t. $Au \leq b + \tau d$, $\tau \geq 0$ where d is a vector with a 1 in position I if $a_i u_f > b_i$ ($a_i$ represents the $i^{th}$ row of A), zeros elsewhere. It can be observed that $u=u_f, \tau=\max_i\{a_i u_f - b_i\}$ is a feasible point for the big M QP, so we have knowledge of a feasible point.

It can be deduced from the theory of exact penalty functions that there exists a finite M_ such that for all $M \geq M_-$, the solution to the big M QP is feasible and optimal for the original QP (6), i.e., has $\tau=0$.

In order to adapt this method for our problem, we need the Hessian quantity with respect to u and $\tau$ to be invertible. To achieve this, we add a term $\frac{1}{2}K\tau^2$ to the objective. Numerical experiments further led us to set M=0, thereby alleviating the need of the $\tau \geq 0$ constraint, though it is possible to leave a non-zero but positive M and the constraint $\tau \geq 0$ in. Our problem, which we will call the 'big-K' problem, thus looks like $$\min_{u,\tau} \frac{1}{2}u^T Hu + c^T u + \frac{1}{2}K\tau^2$$

s.t. $Au \leq b + \tau d$.

It is easy to see that the result implied by the theory of exact penalty functions for the big M problem still holds.

Guessing the Initial Active Set

The guess for the initial active set is intimately related to the model predictive control problem formulation. Let $T=\{t_0, t_0+\Delta t, t_0+2\Delta t, \ldots t_0+(N-1)\Delta t\}$ denote the set of time points under consideration in the time window of the particular MPC problem at time t0. The variables associated with the dynamical system can be expressed as x(T), u(T), y(T) where, for example, u(T) denotes the set of control variables at the time points under consideration, i.e., $u(T)=\{u(t_0), u(t_0+\Delta t), u(t_0+2\Delta t), \ldots u(t_0+(N-1)\Delta t).\}$ Further, in a slightly different notation, (u still denotes the optimization variable) we can describe any particular time-dependent constraint g of th MPC problem as $$0 \leq g_t(u) \leq \beta_t, \text{ for all } t \in T.$$

Note that since t∈T, each such constraint actually appears as N algebraic constraints in the optimization problem. For our quadratic program, g is actually linear, and $g_t$ is a function of no more than $u_{t-1}$, $u_t$, $t_{t+1}$. However, the method of arriving at an initial guess for the active set is applicable in the much more general setting.

Suppose $u^*_{t_0}$ denotes the values of the optimal controls arrived at by executing the iterative algorithm on the optimization problem corresponding to the MPC problem at time $t_0$. The final iteration of the active set algorithm for this problem tells us which constraints are in the active set. Suppose that $g_t$ is active for $t \in T\_ \subseteq T$ (T_ could represent some or all of the points in the set T), i.e., $$g_t(u^*_{t_0}) = \beta_t \text{ for all } t \in T\_.$$

Then the MPC problem at the next time point $t_0 + \Delta t$ is defined over the shifted time window $$T' = \{t_0 + \Delta t, t_0 + 2\Delta t, \ldots t_0 + N\Delta t\}$$

Correspondingly, the constraint $g_t$ appears as $$0 \leq g_t(u) \leq \beta_t, \text{ for all } t \in T',$$

in this following MPC problem. This is the optimization problem we want to active set guess for.

Then, as an initial guess for the MPC problem at time $t_0 + \Delta t$, the constraint $g_t$ is guessed to be active for all $t \in T\_ \cap T'$ (and hence put in the initial active set $W_0$). Further, $g_t$ is guessed to be active at the last time point $t_0 + N\Delta t$, of the MPC problem at time $t_0 + \Delta t$ if it was also active in the last time point $t_0 + (N-1)\Delta t$ of the MPC problem at time $t_0$.

This procedure is repeated for all the constraints in the MPC problem to arrive at the initial guess for the active set.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A method for controlling a multivariable system including the steps of:
   a) sensing current conditions of the system and generating a plurality of sensor signals indicating the current conditions of the system;
   b) receiving a plurality of commands;
   c) in each of a plurality of time steps, formulating a problem of achieving a desired search for the best active set based on a final active set of a prior time step of the dynamic response for a window spanning multiple time steps as a solution to a quadratic programming problem based upon the commands and the sensor signals;
   d) solving the quadratic programming problem in each time step using an interative algorithm which searches for an optional active set;
   e) in each subsequent time step of the plurality of time steps, initializing a search for the best active set based on a final active set of a prior time set of the plurality of time steps; and;
   f) effecting the desired dynamic response on the system based upon said step d).

2. The method of claim 1 wherein the active set comprises a set of constraints that are binding at an optimized solution.

3. The method of claim 2 wherein said step e) further includes the procedure of dropping only one constraint with a negative Lagrange multiplier.

4. The method of claim 2 wherein said step e) further includes the procedure of dropping all constraints that are not binding irrespective of signs of Lagrange multipliers of the constraints.

5. The method of claim 2 further including the steps of:
   determining that the final active set of the prior time step is not feasible in a current timestep;
   minimizing a weighted sum of the original QP problem and a measure of infeasibility.

6. The method of claim 2 further including the steps of:
   determining that the feasible point is largely inconsistent with the active set; and
   retaining inconsistent constraints in the active set while continuing the optimization.

7. The method of claim 1 further including the step of performing a QR factorization in each iterate of the iterative algorithm of said step e).

8. The method of claim 7 wherein a first iterate of the iterative algorithm includes the step of performing a full QR factorization and subsequent iterates include the step of performing a QR factorization update.

9. The method of claim 7 further including the step of detecting degeneracy during each QR factorization.

10. The method of claim 9 further including the step of dropping a degenerate constraint.

11. The method of claim 10 further including the step of detecting linear dependency in the active constraints in each of the iterations without pre-processing.

12. A method for controlling a multivariable system including the steps of:
   a) sensing current conditions of the system and generating a plurality of sensor signals indicating the current conditions of the system;
   b) receiving a plurality of commands;
   c) in each of a plurality of time steps, formulating a problem of achieving a desired dynamic response for a window spanning multiple time steps as a solution to a quadratic programming problem based upon the commands and the sensor signals;
   d) iteratively solving the quadratic programming problem each time step by:
   performing a Cholesky factorization of H in a first iteration;
   reusing the Cholesky factorization in iterations subsequent to the first iteration;
   computing an unconstrained solution in one of the iterations; and
   reusing the unconstrained solution in iterations subsequent to the one of the iterations.
   e) generating commands based upon the solutions to the quadratic programming problem and sending the commands to actuators to generate a physical input to the system.

13. The method of claim 12 further including the step of performing a QR factorization in each iterate of the iterative algorithm.

14. The method of claim 13 wherein an initial iterate of the iterative algorithm includes the step of performing a full QR factorization and subsequent iterates include the step of performing a QR factorization update.

15. The method of claim 13 further including the step of detecting degeneracy during each QR factorization.

16. The method of claim 15 further including the step of dropping a degenerate constraint.

17. The method of claim 16 further including the step of detecting linear dependency in the active constraints in each of the iterations without pre-processing.
   e) generating commands based upon the solutions to the quadratic programming problem.

18. A method for controlling a multivariable system including the steps of:
   a) sensing current conditions of the system and generating a plurality of sensor signals indicating the current conditions of the system;
   b) receiving a plurality of commands;
   c) in each of a plurality of time steps, formulating a problem of achieving a desired dynamic response for a window spanning multiple time steps as a solution to a quadratic programming problem based upon the commands and the sensor signals;
   d) iteratively solving the quadratic programming problem where a set of indices of constraints in the active set is denoted by W and the rows in the constraint matrix A corresponding to the active set are characterized by E, and wherein a feasible point $u_f$ is known, $Au_f \leq b$;
   e) in said step d), choosing an initial guess active set;
   f) in said step d), in iteration k, given a guess E for the active constraints, solving the Equality-Constrained QP (EQP)

$$\min_u \frac{1}{2} u^T H u + c^T u$$

s.t. Eu=r,
where r represents the sub-vector of right hand sides for the active constraints;
   g) in said step d), determining the optimal u*, and Lagrange multipliers λ* as $$\begin{bmatrix} H & E^T \\ E & 0 \end{bmatrix} \begin{bmatrix} u^* \\ \lambda^* \end{bmatrix} = \begin{bmatrix} -c \\ r \end{bmatrix}$$

e)
   e) generating commands based upon the solutions to the quadratic programming problem from said step d) and sending the commands to actuators to generate a physical input to the system.

19. The method of claim 18 further including the steps of:
Determining a largest $\alpha \in [0,1]$ such that $u^{k-1} + \alpha s$ is feasible, where $s = u^* - u^{k-1}$, $u^{-1}$ denotes the prior iterate and $u^0 = u_f$.

20. The method of claim 19 where α is given by $$\alpha = \min_{i \notin W} \frac{b_i - (Au^{k-1})i}{As_i}.$$

21. The method of claim 20 further including the step of updating the guess for the active set in the next iterate.

22. The method of claim 21 further including the step of adding to W the first index $i_B$ corresponding to which α achieves its minimum value in the ratio test, the guess for the active indices in the next iterate.

23. The method of claim 22 further including the step of dropping the constraint with the most negative multiplier from the active set.

24. The method of claim 23 further including the step of: in the first iteration, dropping all constraints that are not consistent if α<1.

25. A model predictive control system comprising:
   a plurality of sensor sampling current conditions of the system including a system output in a plurality of sample periods;
   a desired trajectory generator for creating a desired trajectory based upon the current conditions of the system as sampled by the plurality of the sensors;
   a linearization module deriving a linearized model about the desired trajectory;
   a quadratic programming module in each of a plurality of time steps formulating a problem of achieving the desired trajectory for a multiple time window as a solution to a quadratic programming problem;
   a quadratic programming solver for solving an optimization problem established by the quadratic programming module to generate a profile of optimal controls, the quadratic programming solver solving the quadratic programming problem in each time step using an iterative algorithm which searches for an optimal active set and in each subsequent time step of the plurality of time steps, initializing a search for the best active set based on a final active set of a prior time step of the plurality of time steps; and
   an actuation system effecting the desired trajectory based upon a solution from the quadratic programming solver.

26. The system of claim 25 wherein the active set comprises a set of constraints that are binding at an optimized solution.

27. The system of claim 26 wherein the quadratic programming solver drops only one constraint with a negative Lagrange multipliers.

28. The system of claim 26 wherein the quadratic programming solver drops all constraints that are not binding irrespective of signs of Lagrange multipliers of the constraints.

29. The system of claim 25 the quadratic programming solver performs a QR factorization in each iterate of the iterative algorithm of said step e).

30. The system of claim 29 wherein a first iterate of the iterative algorithm includes performing a full QR factorization and subsequent iterates include performing a QR factorization update.

31. The system of claim 29 wherein the quadratic programming solver detects degeneracy during each QR factorization.

32. The system of claim 31 wherein the quadratic programming solver drops a degenerate constraint.

33. The system of claim 32 wherein the quadratic programming solver detects linear dependency in the active constraints in each of the iterations without pre-processing.

34. A method for controlling a multivariable system including the steps of:
   a) sensing current conditions of the system and generating a plurality of sensor signals indicating the current conditions of the system;
   b) receiving a plurality of commands;
   c) in each of a plurality of time steps, formulating a problem of achieving a desired dynamic response for a window spanning multiple time steps as a solution to a quadratic programming problem based upon the commands and the sensor signals;

d) optimizing the quadratic programming problem of achieving a desired which searches for an optimal active set to solve the quadratic programming problem, wherein said step d) include the steps of determining that an initial starting point set is not feasible and reformulating the problem to obtain a feasible iterate; and e) controlling actuators to effect the desired dynamic response of the system based upon a solution to the quadratic programming problem from said step d).

35. The method of claim 34 wherein said step d) further includes the step of minimizing a weighted sum of the original QP problem and a measure of infeasibility.

* * * * *

UNITED STATES PATENT AND TRADEMARK OFFICE
CERTIFICATE OF CORRECTION

PATENT NO. : 7,152,023 B2
APPLICATION NO. : 10/367458
DATED : December 19, 2006
INVENTOR(S) : Indraneel Das It is certified that error appears in the above-identified patent and that said Letters Patent is hereby corrected as shown below:

Claim 1, Column 13, lines 55-57: Delete "search for the best active set based on a final active set of a prior time step of the"

Claim 1, Column 13, line 62: "interative" should be --iterative--

Claim 1, Column 13, line 63: "optional" should be --optimal--

Claim 1, Column 13, line 66: "set" should be --step--

Claim 12, Column 14, line 56: "." should be --;--

Claim 12, Column 14, line 57: "solutions" should be --solution--

Claim 17, Column 15, lines 8-9: Delete "e) generating commands based upon the solutions to the quadratic programming problem."

Claim 18, Column 15, line 48: Delete "e)"

Claim 18, Column 15, line 49: "the solutions" should be --a solution--

Claim 19, Column 15, line 19: "$u^{-1}$" should be --$u^{k-1}$--

Claim 25, Column 16, line 10: "sensor" should be --sensors--

Claim 25, Column 16, line 15: Delete "the" before "sensors"

Claim 25, Column 16, line 20: Insert --step-- after "time"

UNITED STATES PATENT AND TRADEMARK OFFICE
CERTIFICATE OF CORRECTION

PATENT NO. : 7,152,023 B2
APPLICATION NO. : 10/367458
DATED : December 19, 2006
INVENTOR(S) : Indraneel Das It is certified that error appears in the above-identified patent and that said Letters Patent is hereby corrected as shown below:

Claim 25, Column 17, lines 4-5: Delete "of achieving a desired" and replace with --using an iterative algorithm--

Signed and Sealed this

Twentieth Day of March, 2007

JON W. DUDAS
*Director of the United States Patent and Trademark Office*